(12) United States Patent
Watanabe et al.

(10) Patent No.: US 11,841,651 B2
(45) Date of Patent: Dec. 12, 2023

(54) ENDLESS BELT, BELT UNIT, AND IMAGE FORMING APPARATUS

(71) Applicant: FUJIFILM Business Innovation Corp., Tokyo (JP)

(72) Inventors: Yusuke Watanabe, Kanagawa (JP); Satoya Sugiura, Kanagawa (JP); Kenta Shingu, Kanagawa (JP); Toshiyasu Yukawa, Kanagawa (JP); Minoru Rokutan, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/152,159

(22) Filed: Jan. 10, 2023

(65) Prior Publication Data
US 2023/0244160 A1    Aug. 3, 2023

(30) Foreign Application Priority Data

Jan. 31, 2022   (JP) .................................. 2022-013008

(51) Int. Cl.
| | | |
|---|---|---|
| *G03G 15/16* | (2006.01) | |
| *F16G 1/06* | (2006.01) | |
| *G03G 15/20* | (2006.01) | |
| *G03G 15/01* | (2006.01) | |

(52) U.S. Cl.
CPC ............ *G03G 15/162* (2013.01); *F16G 1/06* (2013.01); *G03G 15/0131* (2013.01); *G03G 15/1605* (2013.01); *G03G 15/206* (2013.01); *G03G 15/2053* (2013.01); *G03G 15/2057* (2013.01); *G03G 2215/00139* (2013.01); *G03G 2215/1623* (2013.01); *G03G 2215/2009* (2013.01); *G03G 2215/2016* (2013.01); *G03G 2221/1615* (2013.01)

(58) Field of Classification Search
CPC ........... G03G 15/0131; G03G 15/1605; G03G 15/162; G03G 15/2053; G03G 15/2057; G03G 15/206; G03G 2215/00139; G03G 2215/1623; G03G 2215/2009; G03G 2215/2016; G03G 2221/1615; F16G 1/06
See application file for complete search history.

(56) References Cited

U.S. PATENT DOCUMENTS

| | | | |
|---|---|---|---|
| 2018/0348672 A1* | 12/2018 | Yoshida | .................. H01J 37/28 |
| 2020/0310266 A1* | 10/2020 | Kikuchi | ............. G03G 15/0233 |
| 2021/0041796 A1* | 2/2021 | Nishioka | ............. G03G 15/0233 |

FOREIGN PATENT DOCUMENTS

| | | |
|---|---|---|
| JP | 2001265130 | 9/2001 |
| JP | 2003131463 | 5/2003 |
| JP | 2012177811 | 9/2012 |

* cited by examiner

*Primary Examiner* — Joseph S Wong
(74) *Attorney, Agent, or Firm* — JCIPRNET (57) ABSTRACT

An endless belt includes a base material layer containing a polymer material and conductive particles, wherein, in an image obtained by observing a cross section taken along a thickness direction of the base material layer with an atomic force microscope, a proportion of a total area Ap of cross sections of all the conductive particles is 9.0% or more and 14.5% or less with respect to a total cross-sectional area At of the base material layer, and a proportion of a total area Ab of cross sections of conductive particles having an area of 0.01 $\mu m^2$ or more among cross sections of the conductive particles is 28.0% or more and 65.0% or less with respect to the total area Ap of cross sections of all the conductive particles.

15 Claims, 3 Drawing Sheets

ENDLESS BELT, BELT UNIT, AND IMAGE FORMING APPARATUS

CROSS-REFERENCE TO RELATED APPLICATIONS

This application is based on and claims priority under 35 USC 119 from Japanese Patent Application No. 2022-013008 filed Jan. 31, 2022.

BACKGROUND

(i) Technical Field

The present disclosure provides an endless belt, a belt unit, and an image forming apparatus.

(ii) Related Art

JP2012-177811A discloses a belt for electrophotography containing polyether ether ketone and carbon black dispersed in the polyether ether ketone.

JP2003-131463A discloses a semiconductive belt containing carbon black in a polyimide-based resin, in which the carbon black has a maximum particle size of 1.0 to 1.5 μm for secondary aggregation and a standard deviation of particle size distribution of 0.5 μm or less.

JP2001-265130A discloses a semiconductive seamless belt formed of a resin material and a carbon filler, in which an average actual particle size of the carbon filler is 0.5 μm or less, and particles having a maximum actual particle size of 3 μm or less and an actual particle size of more than 1 μm account for 2% by weight or less of a total amount of the carbon filler.

An endless belt used as a transfer member of a transfer element that transfers a toner image to a recording medium by application of a voltage is required to have electric field dependency in which a large amount of current flows by increase of resistance in a low electric field and decrease of resistance in a high electric field in order to improve transferability and suppress density unevenness of an image. Examples of a method for obtaining the electric field dependency include a method of adding an appropriate content of conductive particles having a wide particle size distribution to the base material layer of the endless belt.

On the other hand, in an endless belt including a base material layer containing conductive particles having a wide particle size distribution, cracks may occur due to nonuniformity in the particle size of the conductive particles.

SUMMARY

Aspects of non-limiting embodiments of the present disclosure relate to an endless belt including a base material layer containing a polymer material and conductive particles, in which, compared to a case in which a proportion of an area Ap to an area At is less than 9.0% or greater than 14.5%, a proportion of an area Ab to the area Ap is less than 28.0% or greater than 65.0%, or a proportion of a number Nb to a number Np is less than 3.5% or greater than 13.7%, suppression of density unevenness of an image and suppression of occurrence of cracks in the base material layer are both achieved when the endless belt is applied to a transfer element that transfers a toner image to a recording medium.

Aspects of certain non-limiting embodiments of the present disclosure overcome the above disadvantage and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an endless belt including: a base material layer containing a polymer material and conductive particles, wherein, in an image obtained by observing a cross section taken along a thickness direction of the base material layer with an atomic force microscope, a proportion of a total area Ap of cross sections of all the conductive particles is 9.0% or more and 14.5% or less with respect to a total cross-sectional area At of the base material layer, and a proportion of a total area Ab of cross sections of conductive particles having an area of 0.01 $\mu m^2$ or more among cross sections of the conductive particles is 28.0% or more and 65.0% or less with respect to the total area Ap of cross sections of all the conductive particles.

DETAILED DESCRIPTION

Hereinafter, exemplary embodiments of the present disclosure will be described. The following description and examples are merely examples of the exemplary embodiments and are not intended to limit the scope of the exemplary embodiments.

In numerical ranges described in a stepwise manner in the present disclosure, an upper limit value or a lower limit value described in a certain numerical range may be replaced with an upper limit value or a lower limit value of another numerical range in the stepwise description. Further, in a numerical range described in the present disclosure, the upper limit value or the lower limit value of the numerical range may be replaced with the value shown in Examples.

In the present disclosure, the expression "step" includes not only an independent step, but also a step in a case of not being clearly distinguished from the other steps, as long as an object of the step is achieved.

When an exemplary embodiment of the present disclosure is described with reference to a drawing, the configuration of the exemplary embodiment is not limited to the configuration illustrated in the drawing. The sizes of the members in the drawings are conceptual, and the relative relationship in size between the members is not limited thereto.

In the present disclosure, each component may contain a plurality of kinds of the relevant substances. In the present disclosure, in a case where the amount of each component in a composition is referred to and a plurality of kinds of substances corresponding to the component are present in the composition, it means the total amount of the plurality of kinds of substances present in the composition, unless otherwise specified.

[Endless Belt]

First Exemplary Embodiment

An endless belt according to a first exemplary embodiment includes a base material layer containing a polymer material and conductive particles, and in an image obtained by observing a cross section taken along a thickness direction of the base material layer with an atomic force microscope, a proportion of a total area Ap of cross sections of all the conductive particles is 9.0% or more and 14.5% or less with respect to a total cross-sectional area At of the base material layer, and a proportion of a total area Ab of cross sections of conductive particles having an area of 0.01 µm$^2$ or more among cross sections of the conductive particles is 28.0% or more and 65.0% or less with respect to the total area Ap of cross sections of all the conductive particles.

Hereinafter, the proportion of the total area Ap to the total cross-sectional area At is also referred to as a "total particle area rate (%)".

Conductive particles having an area of 0.01 µm$^2$ or more are also referred to as "large-diameter particles", conductive particles having an area of 0.005 µm$^2$ or more and less than 0.01 µm$^2$ are also referred to as "medium-diameter particles", and conductive particles having an area of less than 0.005 µm$^2$ are also referred to as "small-diameter particles".

In addition, the proportion of the total area Ab of the cross sections of the large-diameter particles to the total area Ap is also referred to as a "large-diameter area rate (%)", and the proportion of the total area Am of the cross sections of the medium-diameter particles to the total area Ap is also referred to as a "medium-diameter area rate (%)".

Herein, the term "conductive particles" means that the particles have a volume resistivity of less than $1 \times 10^{13}$ Ω·cm at 20° C.

The endless belt according to the first exemplary embodiment is incorporated in, for example, an electrophotographic image forming apparatus as a part of a transfer element. The endless belt according to the first exemplary embodiment is used, for example, as a transfer member (for example, a secondary transfer belt or an intermediate transfer belt) of a transfer element that transfers a toner image onto a recording medium. The endless belt according to the first exemplary embodiment transports, for example, a recording medium or a toner image.

An endless belt used as a transfer member of a transfer element that transfers a toner image to a recording medium desirably has a characteristic in which electric resistance clearly varies depending on an applied voltage. For example, it is desired that there is a clear difference between the resistance value at the applied voltage of 100 V and the resistance value at the applied voltage of 500 V. In this case, the endless belt has a relatively high resistance while the transfer step is not in operation, resulting in a property that a toner is less likely to adhere to a surface of the endless belt, whereas the endless belt has a relatively low resistance while the transfer step is in operation, resulting in a property that the endless belt has excellent transfer performance. The transfer performance can be evaluated by, for example, the density unevenness of the image.

In the case where an endless belt is used as a transfer member of a transfer element that transfers a toner image to a recording medium by application of a voltage as described above, in order to improve transferability and suppress density unevenness of an image, "electric field dependency" is required in which a large amount of current flows by increase of resistance in a low electric field and decrease of resistance in a high electric field. It is thought that, when the endless belt has electric field dependency, the resistance is reduced in a high electric field, and thus the voltage and current may be reduced in a low-temperature and low-humidity environment (hereinafter also referred to as "Cz") of a temperature of 10° C. and a humidity of 15%, and color loss (for example, white spots) due to abnormal discharge is unlikely to occur. It is also thought that self charge elimination is accelerated due to increase of resistance in a low electric field, image history of the previous cycle is less likely to influence on the next cycle, and thus density unevenness is unlikely to occur.

Examples of a method for obtaining the electric field dependency include a method of adding an appropriate amount of conductive particles having a wide particle size distribution to the base material layer of the endless belt. The conductive particles having a wide particle size distribution include particles having a relatively large diameter and particles having a relatively small diameter.

However, in an endless belt including a base material layer containing conductive particles having a large particle size distribution, cracks may occur due to the nonuniformity of the particle size of the conductive particles.

Specifically, for example, in the case where the base material layer of the endless belt contains conductive particles including particles having a relatively large diameter and particles having a relatively small diameter, repeated deformation during use causes the stress to be locally concentrated on the particles having a large diameter, which may cause cracks in the base material layer.

In contrast, in the endless belt according to the first exemplary embodiment, the total particle area rate is within the above-described range, and the large-diameter area rate is larger than that in the related art and within the above-described range. Thus, when the endless belt is applied to a transfer element that transfers a toner image to a recording medium, the density unevenness of an image is suppressed and the occurrence of cracks in the base material layer is suppressed. Although the exact reason therefor is not clear, it is presumed as follows.

First, the total particle area rate corresponds to the content of the conductive particles with respect to the entire base material layer. When the total particle area rate is within the above-described range, the resistance value of the entire endless belt is not excessively high as compared with the case where the total particle area rate is lower than the above-described range, and the endless belt is suitable as a transfer member. In addition, in a case where the total particle area rate is in the above-described range, as compared with a case where the total particle area rate is higher than the above-described range, excessive flow of a current under a low electric field is suppressed, and electric field dependency is easily obtained.

In the first exemplary embodiment, the large-diameter area rate is within the above-described range while the total particle area rate is within the above-described range. Here, in the endless belt having a total particle area rate within the above-described range and a large-diameter area rate smaller than the above-described range, the number of large-diameter particles contained in the base material layer is small. That is, it is considered that, in a case where the large-diameter area rate is within the above-described range, the stress is easily distributed in a not too small number of large-diameter particles as compared with a case where the large-diameter area rate is smaller than the above-described range, and the occurrence of cracks due to stress concentration on a small number of scattered large-diameter particles is suppressed.

The number of small-diameter particles and medium-diameter particles is small in the endless belt including the base material layer having a total particle area rate within the above-described range and a large-diameter area rate greater than the above-described range. That is, it is considered that, in a case where the large-diameter area rate is within the above-described range, the number of small-diameter particles and medium-diameter particles is not too small as compared with a case where the large-diameter area rate is larger than the above-described range, so that electric field dependency is easily obtained, and stress concentration on the large-diameter particles is also suppressed.

Presumably, due to the reasons described above, when the endless belt according to the first exemplary embodiment is applied to a transfer element that transfers a toner image onto a recording medium, both suppression of density unevenness of an image and suppression of generation of cracks in the base material layer may be achieved.

Second Exemplary Embodiment

An endless belt according to a second exemplary embodiment includes a base material layer containing a polymer material and conductive particles, and in an image obtained by observing a cross section taken along a thickness direction of the base material layer with an atomic force microscope, a proportion of a total area Ap of cross sections of all the conductive particles is 9.0% or more and 14.5% or less with respect to a total cross-sectional area At of the base material layer, and a proportion of a number Nb of cross sections of conductive particles having an area of 0.01 $\mu m^2$ or more among cross sections of the conductive particles is 3.5% or more and 13.7% or less with respect to a total number Np of cross sections of the conductive particles.

Hereinafter, the proportion of the number Nb of cross sections of large-diameter particles to the total number Np of cross sections of conductive particles will also be referred to as "large-diameter number rate (%)", and the proportion of the number Nm of cross sections of medium-diameter particles to the total number Np of cross sections of conductive particles will also be referred to as "medium-diameter number rate (%)".

As described above, the endless belt according to the second exemplary embodiment is incorporated in, for example, an electrophotographic image forming apparatus as a part of a transfer element. The endless belt according to the second exemplary embodiment is used, for example, as a transfer member (for example, a secondary transfer belt or an intermediate transfer belt) of a transfer element that transfers a toner image onto a recording medium. The endless belt according to the second exemplary embodiment transports, for example, a recording medium or a toner image.

As described above, an endless belt used as a transfer member of a transfer element that transfers a toner image to a recording medium by application of a voltage is required to have electric field dependency in order to suppress density unevenness of an image. As described above, when an appropriate content of conductive particles having a wide particle size distribution is contained in the base material layer of the endless belt in order to obtain electric field dependency, cracks may occur in the base material layer of the endless belt due to nonuniformity in the particle size of the conductive particles.

In contrast, in the endless belt according to the second exemplary embodiment, the total particle area rate is within the above-described range, and the large-diameter area rate is larger than that in the related art and within the above-described range. Thus, when the endless belt is applied to a transfer element that transfers a toner image to a recording medium, the density unevenness of an image is suppressed and the occurrence of cracks in the base material layer is suppressed. Although the exact reason therefor is not clear, it is presumed as follows.

As described above, the total particle area rate corresponds to the content of the conductive particles with respect to the entire base material layer. When the total particle area rate is within the above-described range, the resistance value of the entire endless belt is not too large, and the endless belt is suitable as a transfer member as compared with the case where the total particle area rate is lower than the above-described range, and excessive current flow under a low electric field is suppressed, and electric field dependency is easily obtained as compared with the case where the total particle area rate is higher than the above-described range.

Further, in the second exemplary embodiment, the large-diameter number rate is set within the above range while the total particle area rate is set within the above range. As a result, it is considered that, compared with a case where the total particle area rate is within the above-described range and the large-diameter number rate is smaller than the above-described range, the stress is easily distributed in a not too small number of large-diameter particles, and the occurrence of cracks due to stress concentration on a small number of scattered large-diameter particles is suppressed. In addition, it is considered that, by setting the large-diameter number rate within the above range while setting the total particle area rate within the above range, the number of small-diameter particles and medium-diameter particles is not too small as compared with a case where the total particle area rate is within the above range and the large-diameter number rate is larger than the above range, so that electric field dependency is easily obtained, and stress concentration on the large-diameter particles is also suppressed.

Presumably, due to the reasons described above, when the endless belt according to the second exemplary embodiment is applied to a transfer element that transfers a toner image onto a recording medium, both suppression of density unevenness of an image and suppression of occurrence of cracks in the base material layer may be achieved.

Hereinafter, an endless belt corresponding to both the endless belt according to the first exemplary embodiment and the endless belt according to the second exemplary embodiment will be referred to as an "endless belt according to an exemplary embodiment". However, an example of the endless belt according to the present invention may be an endless belt corresponding to at least one of the endless belt according to the first exemplary embodiment and the endless belt according to the second exemplary embodiment.

The endless belt according to the exemplary embodiment is described in detail below.

<Cross Section Observation of Base Material Layer>

The cross section of the base material layer is observed as follows.

-Production of Sample-

The endless belt is cut in the thickness direction parallel to the width direction by a cryomicrotome method to prepare section samples. A total of 20 section samples are prepared by cutting the endless belt at 5 positions at equal intervals in the width direction of the endless belt (that is, evenly from the vicinity of one end to the vicinity of the other end) and 4 positions at equal intervals in the circumferential direction.

The cut surface of each of the 20 section samples is observed with an atomic force microscope (AFM) in an angular field of 5 μm in the thickness direction and 5 μm in the width direction to obtain a phase image. In each of the 20 phase images, an Otsu's binarization process was performed in the square region by image analysis software, and the dark portion was determined as conductive particles.

-Area Rate of Conductive Particles-

All the conductive particles (that is, dot-like dark portions) present in the rectangular region subjected to the binarization process are set as measurement targets. The area of each of the conductive particles is measured, the areas of all the conductive particles are summed up, and the proportion of the area of the conductive particles (that is, the total area Ap of the cross sections of all the conductive particles) in the area of the rectangle (that is, the total cross-sectional area At) (that is, the area rate of conductive particles) is calculated. The same measurement is performed on 20 phase images, and the area rates of the 20 phase images are arithmetically averaged to obtain the "total particle area rate (%)".

In addition, an equivalent circular diameter is obtained for each of all the conductive particles present in the binarized rectangular region, and the conductive particles are classified into large-diameter particles, medium-diameter particles, and small-diameter particles from the value of the equivalent circular diameter. Then, the total area Ab of the cross sections of the large-diameter particles, the total area Am of the cross sections of the medium-diameter particles, the total area As of the cross sections of the small-diameter particles, the number Nb of the cross sections of the large-diameter particles, the number Nm of the cross sections of the medium-diameter particles, the number Ns of the cross sections of the small-diameter particles, and the average equivalent circular diameter are obtained.

In the exemplary embodiment, the total particle area rate is 9.0% or more and 14.5% or less, preferably 9.5% or more and 14.0% or less, and more preferably 10.0% or more and 13.0% or less.

The large-diameter area rate of the endless belt according to the first exemplary embodiment is 28.0% or more and 65.0% or less, preferably 35.2% or more and 61.3% or less, and more preferably 42.2% or more and 60.0% or less. The large-diameter number rate in the endless belt according to the first exemplary embodiment is preferably 3.5% or more and 13.7% or less, more preferably 3.8% or more and 13.7% or less, and even more preferably 3.8% or more and 13.0% or less.

The large-diameter area rate of the endless belt according to the second exemplary embodiment is preferably 28.0% or more and 65.0% or less, more preferably 35.2% or more and 61.3% or less, and even more preferably 42.2% or more and 60.0% or less. The large-diameter number rate in the endless belt according to the second exemplary embodiment is 3.5% or more and 13.7% or less, preferably 3.8% or more and 13.7% or less, and more preferably 3.8% or more and 13.0% or less.

In the exemplary embodiment, the medium-diameter area rate is preferably 16.1% or more and 21.8% or less, more preferably 16.5% or more and 21.0% or less, and still more preferably 17.0% or more and 20.7% or less.

When the medium-diameter area rate is within the above-described range, density unevenness of an image is suppressed as compared with a case where the total particle area rate is within the above-described range, the large-diameter area rate is within the above-described range, and the medium-diameter area rate is smaller than the above-described range. The reason is not clear, but it is considered that since the number of small-diameter particles contained in the base material layer is not too large, the distance between the medium-diameter particles and the large-diameter particles is appropriately maintained, and thus electric field dependency is easily obtained.

When the medium-diameter area rate is in the above-described range, density unevenness of an image is suppressed as compared with the case where the total particle area rate is in the above-described range, the large-diameter area rate is in the above-described range, and the medium-diameter area rate is larger than the above-described range. The reason is not clear, but it is considered that since the number of small-diameter particles contained in the base material layer is not too small, a current can flow between medium-diameter particles or large-diameter particles that are easy to pass a current as compared with small-diameter particles, and thus electric field dependency can be easily obtained.

In the exemplary embodiment, the medium-diameter number rate is preferably 7.5% or more and 13.5% or less, more preferably 8.0% or more and 13.5% or less, and still more preferably 8.0% or more and 13.0% or less.

When the medium-diameter number rate is within the above-described range, the density unevenness of an image is suppressed as compared with a case where the total particle area rate is within the above-described range, the large-diameter number rate is within the above-described range, and the medium-diameter number rate is smaller than the above-described range. The reason for this is not clear, but is presumed to be the same as the reason why density unevenness of an image is suppressed in a case where the medium-diameter area rate is within the above-described range as compared with a case where the total particle area rate is within the above-described range, the large-diameter area rate is within the above-described range, and the medium-diameter area rate is smaller than the above-described range.

When the medium-diameter number rate is within the above-described range, density unevenness of an image is suppressed as compared with the case where the total particle area rate is within the above-described range, the large-diameter number rate is within the above-described range, and the medium-diameter number rate is larger than the above-described range. The reason is not clear, but is presumed to be the same as the reason why density unevenness of an image is suppressed in a case where the medium-diameter area rate is in the above-described range as compared with a case where the total particle area rate is in the above-described range, the large-diameter area rate is in the above-described range, and the medium-diameter area rate is larger than the above-described range.

In the exemplary embodiment, the average equivalent circular diameter of cross sections of the conductive particles is preferably 26.7 nm or more and 43.8 nm or less, more preferably 28.0 nm or more and 42.5 nm or less, and still more preferably 29.0 nm or more and 42.0 nm or less.

It is presumed that, in a case where the average equivalent circular diameter is in the above-described range, the particle size is not excessively small as compared with a case where the average equivalent circular diameter is smaller than the above-described range, and thus both suppression of density unevenness of an image and suppression of occurrence of cracks in the base material layer are achieved. Further, it is assumed that, in a case where the average equivalent circular diameter is in the above-described range, the particle size is not excessively large as compared with a case where the average equivalent circular diameter is larger than the above-described range, and thus both suppression of density unevenness of an image and suppression of occurrence of cracks in the base material layer are achieved.

The method of controlling the total particle area rate, the large-diameter area rate, the medium-diameter area rate, the large-diameter number rate, the medium-diameter number rate, and the average equivalent circular diameter is not particularly limited, and examples thereof include a method of adjusting the particle size distribution and addition amount of conductive particles to be added, a method of adjusting the kneading time of a composition containing a polymer material and conductive particles, and a combination of these methods in a process of forming a base material layer of an endless belt.

<Layer Configuration>

The endless belt according to the exemplary embodiment includes a base material layer containing a polymer material and conductive particles. The endless belt according to the exemplary embodiment may have a release layer on at least one of the outer peripheral surface and the inner peripheral surface of the base material layer.

When the endless belt is a laminate, the release layer may be provided only on the outer peripheral surface of the base material layer, only on the inner peripheral surface of the base material layer, or on both the outer peripheral surface and the inner peripheral surface of the base material layer. Optionally, another layer such as an elastic layer may be provided between the base material layer and the release layer.

The endless belt according to the exemplary embodiment may be a single layer including only the base material layer without the release layer.

Figure 1:
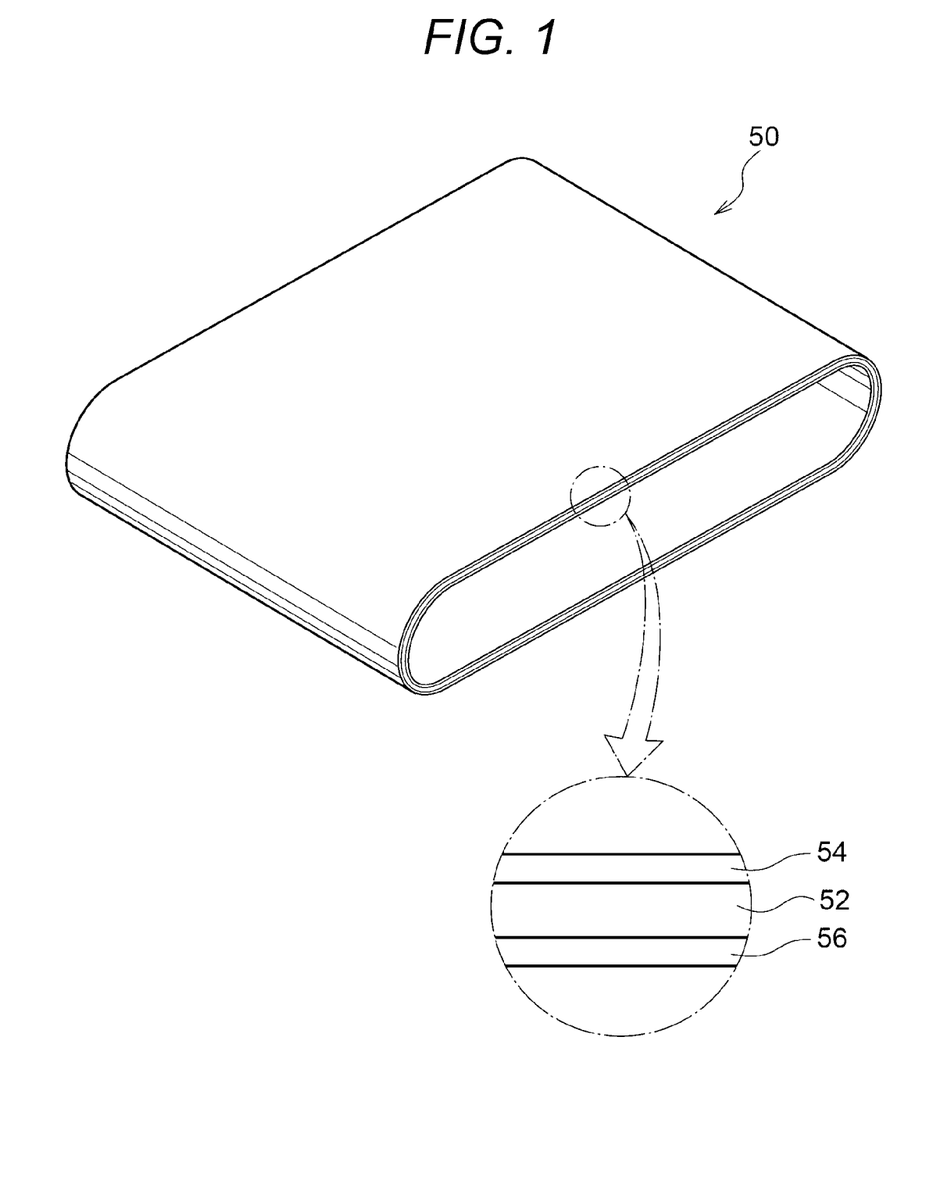
FIG. 1 is a schematic perspective view illustrating an example of an endless belt according to an exemplary embodiment.

FIG. 1 is a schematic perspective view illustrating an example of an endless belt according to an exemplary embodiment. An endless belt 50 illustrated in FIG. 1 includes a base material layer 52, a release layer 54, and a release layer 56. The release layer 54 is disposed on the outer peripheral surface of the base material layer 52 and constitutes the outer peripheral surface of the endless belt 50. The release layer 56 is disposed on the inner peripheral surface of the base material layer 52 and constitutes the inner peripheral surface of the endless belt 50.

The endless belt according to the exemplary embodiment preferably further includes a release layer provided on at least one of the outer peripheral surface and the inner peripheral surface of the base material layer.

When an endless belt is used as a transfer member (for example, a secondary transfer belt or an intermediate transfer belt) of a transfer element that transfers a toner image onto a recording medium, the release layer on the outer peripheral surface of the base material layer facilitates separation of the recording medium or the toner image from the surface of the endless belt. Therefore, the load applied to the rotation of the endless belt in the transfer step is reduced.

When an endless belt is used as a transfer member of a transfer element that transfers a toner image onto a recording medium, the release layer provided on the inner peripheral surface of the base material layer improves the slidability between the surface of the endless belt and a support member that supports the endless belt and reduces the load applied to the rotation of the endless belt.

A layer configuration and materials of the endless belt according to the exemplary embodiment are described in detail below.

<Base Material Layer>

The base material layer is preferably a film or a sheet in which a polymer material contains conductive particles.

(Polymer Material)

Examples of the polymer material include rubber and resin. The polymer material may be used alone or in combination of two or more thereof.

Examples of the rubber include chloroprene rubber, epichlorohydrin rubber, isoprene rubber, butyl rubber, polyurethane, silicone rubber, fluororubber, styrene-butadiene rubber, butadiene rubber, nitrile rubber (NBR), ethylene propylene rubber, ethylene-propylene-diene ternary copolymer rubber (EPDM), natural rubber, and mixed rubber thereof.

Examples of the resin include polyamide, polyimide, polyamide imide, polyether imide, polyether ether ketone, polyphenylene sulfide, polyether sulfone, polyphenyl sulfone, polysulfone, polyethylene terephthalate, polybutylene terephthalate, polyacetal, polycarbonate, polyester, and mixed resins thereof.

Above all, the polymer material contained in the base material layer preferably contains an ion-conductive rubber. In a case where the polymer material contains the ion-conductive rubber, there is an advantage that the influence of humidity on conductivity can be further reduced.

The ion-conductive rubber is a rubber having ion conductivity, and examples thereof include a rubber exhibiting conductivity by dissociation of ions and movement of the ions. Examples of the ion-conductive rubber include polar rubber, and more specific examples thereof include epichlorohydrin rubber (ECO) and chloroprene rubber (CR).

Among the ion-conductive rubbers, the polymer material contained in the base material layer preferably contains at least one selected from the group consisting of epichlorohydrin rubber and chloroprene rubber, and more preferably contains chloroprene rubber. In a case where the polymer material contains at least one selected from the group consisting of epichlorohydrin rubber and chloroprene rubber, there is an advantage that the volume resistance of the base material layer can be maintained at a low level, compared to a case where the ion-conductive rubber contained in the polymer material is only a compound other than the epichlorohydrin rubber and the chloroprene rubber (an example of the compound is EPDM).

The polymer material contained in the base material layer may contain a compound other than the ion-conductive rubber.

Examples of the compound other than the ion-conductive rubber include an ethylene-propylene-diene ternary copolymer rubber, an acrylonitrile-butadiene rubber, and a urethane rubber. Above all, the compound other than the ion-conductive rubber is preferably a rubber other than the ion-conductive rubber, and among the rubbers other than the ion-conductive rubber, from the viewpoint of stability against humidity, ethylene-propylene-diene rubber and acrylonitrile-butadiene rubber are preferable.

The polymer material contained in the base material layer preferably contains both the ion-conductive rubber and a compound other than the ion-conductive rubber, more preferably contains both at least one selected from the group consisting of epichlorohydrin rubber and chloroprene rubber and at least one selected from the group consisting of ethylene-propylene-diene ternary copolymer rubber and acrylonitrile-butadiene rubber, and still more preferably contains both chloroprene rubber and ethylene-propylene-diene ternary copolymer rubber.

(Conductive Particles)

Examples of the conductive particles include carbon blacks such as Ketjen black, oil furnace black, channel black, and acetylene black; metal particles such as aluminum and nickel; and metal oxide particles such as indium tin oxide, tin oxide, zinc oxide, titanium oxide, and yttrium oxide. The conductive particles are preferably carbon black. The conductive particles may be used singly, or two or more kinds of conductive particles may be used in combination.

Above all, the conductive particles contained in the base material layer preferably include electron-conductive particles. In a case where the conductive particles include electron-conductive particles, electric field dependency is easily obtained.

The electron-conductive particles are particles having electron conductivity, and examples thereof include particles exhibiting conductivity by the migration of electrons. Examples of the electron-conductive particles include carbon black, metal particles, and metal oxide particles, and among these, carbon black is preferable.

In addition, from the viewpoint of imparting conductivity, among carbon blacks, Ketjen black and acetylene black having high conductivity are preferable, and acetylene black having good compatibility with a resin is more preferable as the conductive particles.

The average primary particle size of the conductive particles is preferably 26.7 nm or more and 43.8 nm or less, more preferably 29.8 nm or more and 39.6 nm or less, and still more preferably 30.5 nm or more and 38.0 nm or less.

When two or more kinds of conductive particles having different average primary particle sizes are used in combination, the average value of primary particle sizes of all of the two or more kinds of conductive particles is preferably within the above-described range.

The base material layer may contain a conductive agent other than the conductive particles. Examples of the conductive agent other than the conductive particles include ion-conductive substances such as potassium titanate, potassium chloride, sodium perchlorate, and lithium perchlorate; and ion-conductive polymer materials such as polyaniline, polyether, polypyrrole, polysulfone, and polyacetylene. The conductive agents may be used alone or in combination of two or more kinds thereof.

The base material layer is preferably a conductive elastic layer containing rubber and conductive particles, and more preferably a conductive elastic layer containing carbon black and at least one of chloroprene rubber and epichlorohydrin rubber.

The total content of the conductive particles and the conductive agent in the base material layer is preferably set based on the volume resistivity of the endless belt. The endless belt preferably has a volume resistivity of $1.0 \times 10^7$ Ω·cm or more and $1.0 \times 10^{11}$ Ω·cm or less, preferably $1.0 \times 10^7$ Ω·cm or more and $5.0 \times 10^{10}$ Ω·cm or less, and preferably $1.0 \times 10^7$ Ω·cm or more and $3.0 \times 10^{10}$ Ω·cm or less.

In the exemplary embodiment, the volume resistivity (Ω·cm) is measured as follows. The measurement is performed at a temperature of 22° C. and a relative humidity of 55%. The sample is placed in the measurement environment for 24 hours or longer to control the temperature and humidity. The resistance meter is a microammeter (R8430A manufactured by Advantest Corporation), and the probe is a UR probe (manufactured by Mitsubishi Chemical Corporation). The applied voltage is 1 kV, the application time is 5 seconds, and the load is 1 kgf. A total of 18 measurement points taken at 6 points at equal intervals in the circumferential direction of the endless belt and 3 points at the center and both ends in the width direction of the endless belt are measured. The measured values at the 18 points are arithmetically averaged.

In a case where the base material layer contains carbon black, the content of carbon black is preferably 5 parts by mass or more and 40 parts by mass or less with respect to 100 parts by mass of the polymer material.

The base material layer may contain additives such as an antioxidant, a crosslinking agent, a flame retardant, a colorant, a surfactant, a dispersant, and a filler.

The average thickness of the base material layer is preferably 0.1 μm or more, more preferably 0.5 μm or more, and even more preferably 1 μm or more from the viewpoint of the durability of the endless belt, and is preferably 1,000 μm or less, more preferably 800 μm or less, and even more preferably 600 μm or less from the viewpoint of the flexibility and bending resistance of the endless belt.

<Release Layer>

The endless belt according to the exemplary embodiment may have a release layer on at least one of the outer peripheral surface and the inner peripheral surface of the base material layer, and preferably has a release layer on the outer peripheral surface and the inner peripheral surface of the base material layer. The release layer provided on the outer peripheral surface of the base material layer constitutes the outer peripheral surface of the endless belt. The release layer provided on the inner peripheral surface of the base material layer constitutes the inner peripheral surface of the endless belt.

The release layer is preferably a film or a sheet containing a polymer material.

Examples of the polymer material include the above-described rubber and resin described for the base material layer.

The release layer preferably contains a urethane resin and fluorine-containing resin particles.

A urethane resin (also referred to as polyurethane or urethane rubber) is generally synthesized by polymerizing polyisocyanate and polyol. The urethane resin preferably has a hard segment and a soft segment.

The fluorine-containing resin particles are preferably one or more types of particles formed of, for example, any of tetrafluoroethylene resin, chlorotrifluoroethylene resin, hexafluoropropylene resin, vinyl fluoride resin, vinylidene fluoride resin, dichlorodifluoroethylene resin, and the copolymer thereof. Among these, tetrafluoroethylene resin particles are preferred as the fluorine-containing resin particles.

The average primary particle size of the fluorine-containing resin particles is preferably 50 nm or more and 500 nm or less, more preferably 70 nm or more and 480 nm or less, and even more preferably 100 nm or more and 450 nm or less.

Additives such as an antioxidant, a crosslinking agent, a flame retardant, a colorant, and a filler may be contained in the release layer.

The average thickness of the release layer on one surface of the base material layer is preferably 3.0 μm or more, more preferably 3.5 μm or more, and still more preferably 4.0 μm or more from the viewpoint of the abrasion resistance of the release layer, and is preferably 12.0 μm or less, more preferably 10.5 μm or less, and still more preferably 9.0 μm or less from the viewpoint of the flexibility and bending resistance of the endless belt.

[Method for Manufacturing Endless Belt]

Examples of the method for manufacturing the endless belt include a manufacturing method in which a tubular member serving as a base material layer is prepared and a release layer is formed on the outer peripheral surface or the inner peripheral surface of the tubular member.

Examples of the method of manufacturing the tubular member include extrusion molding in which a composition containing a polymer material and conductive particles is melted, extruded in a belt shape from a die, and solidified; injection molding in which a composition containing a polymer material and conductive particles is melted, placed in a belt-shaped mold, and solidified; and coating molding in which a composition containing a precursor or monomer of a polymer material and conductive particles is applied to a core body and solidified.

Examples of the method of forming the release layer include a method of applying a liquid composition containing a polymer material and fluorine-containing resin particles to the outer peripheral surface or the inner peripheral surface of a tubular member and solidifying the liquid composition; and a method of applying a liquid composition containing a precursor or monomer of a polymer material and fluorine-containing resin particles to the outer peripheral surface or the inner peripheral surface of a tubular member and solidifying the liquid composition. In order to solidify the liquid composition, drying, heating, electron beam irradiation, or ultraviolet irradiation may be performed depending on the kind of the component.

<Belt Unit>

Figure 2:
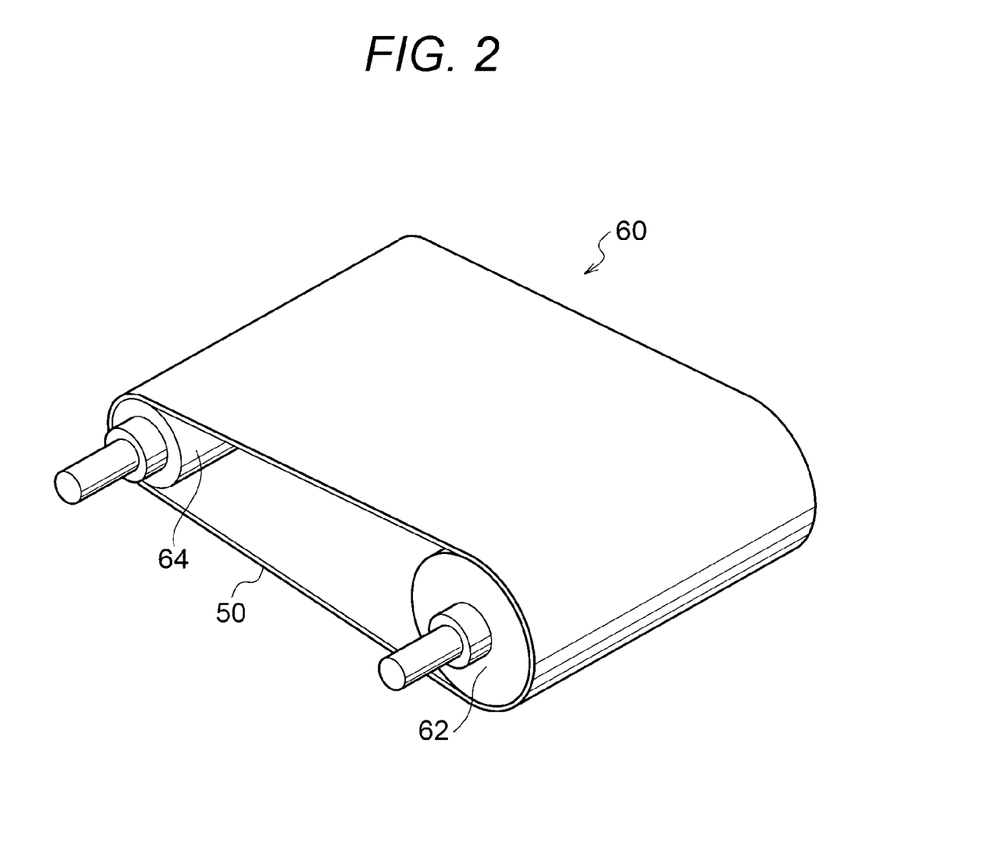
FIG. 2 is a schematic perspective view illustrating an example of a belt unit according to an exemplary embodiment.

FIG. 2 is a schematic perspective view illustrating an example of a belt unit according to an exemplary embodiment.

A belt unit 60 is shown in a schematic perspective view illustrating a state in which an endless belt is wound around a plurality of roller members. The belt unit 60 includes an endless belt 50, a driving roller 62, and a support roller 64, and has a form in which the endless belt 50 is wound around the driving roller 62 and the support roller 64 under tension (hereinafter, the form is also referred to as "stretched"). The driving roller 62 is rotated by the power of a driving unit (not illustrated) connected to the driving roller 62. The endless belt 50 and the support roller 64 are rotated by the rotation of the driving roller 62.

The belt unit 60 is incorporated in an electrophotographic image forming apparatus as a part of a transfer element. The belt unit 60 is suitable for a secondary transfer belt unit. The number of roller members over which the endless belt 50 is stretched in the belt unit 60 is not limited to two, and may be three or more.

<Image Forming Apparatus>

An image forming apparatus of an exemplary embodiment includes a photoreceptor, a charging element that serves for charging a surface of the photoreceptor, an electrostatic image-forming element that serves for forming an electrostatic image on the charged surface of the photoreceptor, a developing element that serves for containing a developer containing a toner and for forming a toner image by developing the electrostatic image on the surface of the photoreceptor with the developer, and a transfer element that includes the belt unit according to the exemplary embodiment and serves for transferring the toner image to a recording medium. The transfer element includes, for example, an intermediate transfer member, a primary transfer element which transfers a toner image to the surface of the intermediate transfer member, and a secondary transfer element which transfers the toner image transferred to the surface of the intermediate transfer member to a recording medium, and the secondary transfer element includes the belt unit according to the exemplary embodiment.

The image forming apparatus according to the exemplary embodiment may further include, for example, a fixing element that fixes the toner image transferred to the surface of the recording medium; a photoreceptor cleaning element that cleans the surface of the photoreceptor before charging after the toner image is transferred; and a charge eliminating element that eliminates charge by irradiating the surface of the photoreceptor with charge eliminating light before charging after the toner image is transferred. A portion that includes the developing element of the image forming apparatus according to the exemplary embodiment may be configured as a cartridge (process cartridge) detachably attachable to the image forming apparatus.

A non-limiting example of the image forming apparatus according to the exemplary embodiment will be described below. The main components illustrated in the drawings are described, and the descriptions of other components not illustrated in the drawings are omitted in the following description.

Figure 3:
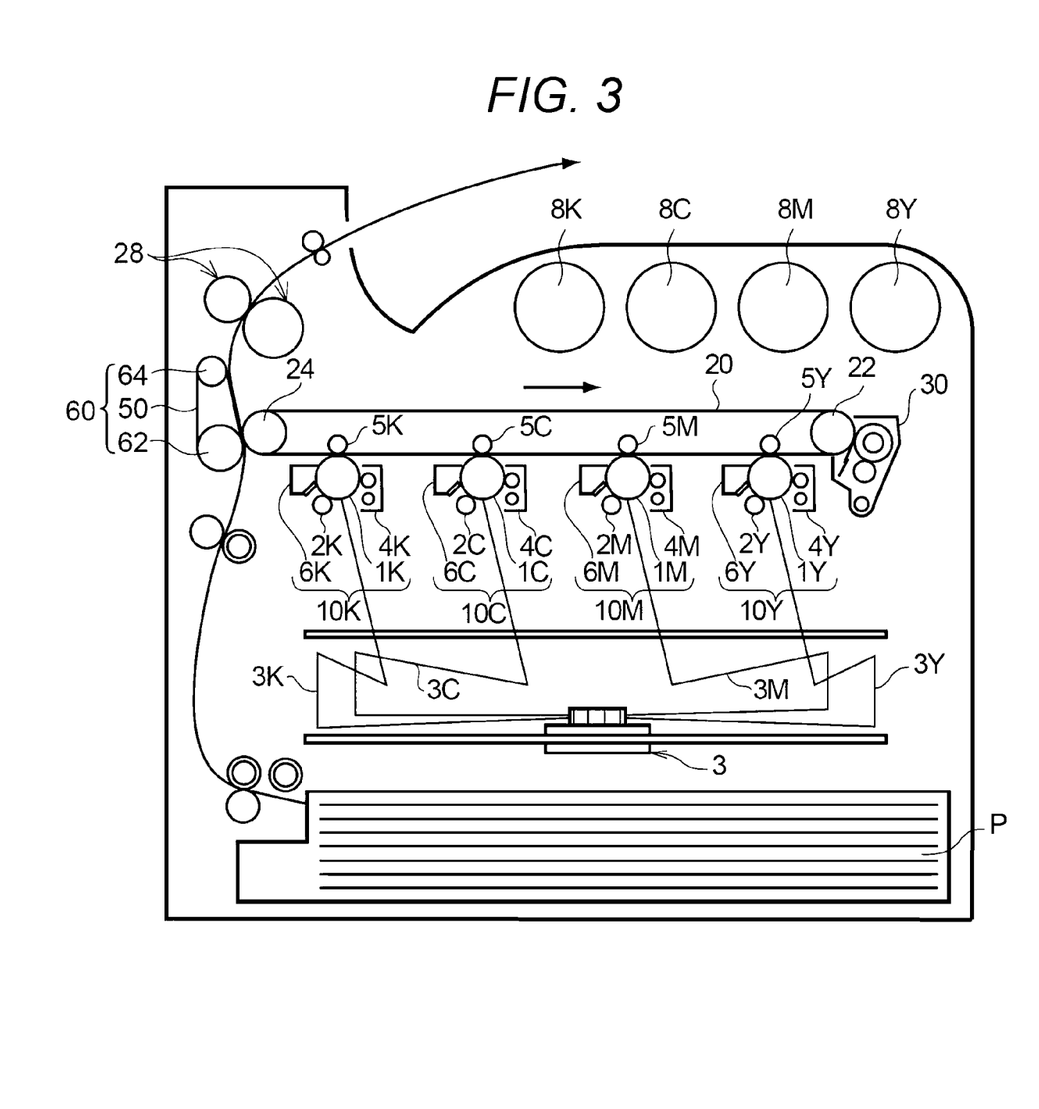
FIG. 3 is a schematic diagram illustrating an example of an image forming apparatus according to an exemplary embodiment.

FIG. 3 is a schematic diagram illustrating an example of an image forming apparatus according to an exemplary embodiment.

The image forming apparatus illustrated in FIG. 3 includes first to fourth electrophotographic image forming units 10Y, 10M, 10C, 10K (image-forming elements) which output yellow (Y), magenta (M), cyan (C), and black (K) color images, respectively, on the basis of image data separately corresponding to these colors. The image forming units (may be referred to as "units" hereinafter) 10Y, 10M, 10C, 10K are arranged side-by-side in the horizontal direction at predetermined intervals. The units 10Y, 10M, 10C, 10K may be configured as a process cartridge detachably attached to the image forming apparatus.

An intermediate transfer belt (an example of an intermediate transfer member) 20 is disposed above the units 10Y, 10M, 10C, 10K so as to extend over the units 10Y, 10M, 10C, 10K. The intermediate transfer belt 20 is stretched over a driving roller 22 and a support roller 24 disposed in contact with the inner surface of the intermediate transfer belt 20 and travels in the direction from the first unit 10Y toward the fourth unit 10K.

Force is applied to the support roller 24 with a spring or the like not shown in the drawing in the direction away from the driving roller 22 so that tension is applied to the intermediate transfer belt 20 stretched over the two rollers. An intermediate transfer belt cleaning device 30 is provided on the image-carrying surface side of the intermediate transfer belt 20 so as to oppose the driving roller 22.

Yellow, magenta, cyan, and black toners respectively contained in toner cartridges 8Y, 8M, 8C, 8K are respectively supplied to developing devices (an example of a developing element) 4Y, 4M, 4C, 4K of the respective units 10Y, 10M, 10C, 10K.

Since the first to fourth units 10Y, 10M, 10C, 10K have the same structure and operation, the first unit 10Y configured to form a yellow image and disposed on the upstream side in the intermediate transfer belt running direction is described as a representative example.

The first unit 10Y includes a photoreceptor 1Y. A charging roller (an example of charging element) 2Y that charges the surface of the photoreceptor 1Y to a predetermined potential, an exposure device (an example of electrostatic image-forming element) 3 that forms an electrostatic image by exposing the charged surface with a laser beam 3Y on the basis of a color-separated image signal, a developing device (an example of developing element) 4Y that develops the electrostatic image by supplying a charged toner to the electrostatic image, a primary transfer roller (an example of primary transfer element) 5Y that transfers the developed toner image onto the intermediate transfer belt 20, and a photoreceptor cleaning device 6Y that removes the toner remaining on the surface of the photoreceptor 1Y after the primary transfer are sequentially provided around the photoreceptor 1Y.

The primary transfer roller 5Y is disposed on the inner side of the intermediate transfer belt 20 and opposes the photoreceptor 1Y. Primary transfer rollers 5Y, 5M, 5C, 5K of the individual units are individually connected to bias supplies (not illustrated) used for applying a primary transfer bias.

The belt unit 60 includes an endless belt 50 (an example of the endless belt according to the exemplary embodiment). The belt unit 60 includes the endless belt 50, a driving roller 62, and a support roller 64. The belt unit 60 is disposed on the outer side of the intermediate transfer belt 20 and opposes the support roller 24. A bias supply (not illustrated) used for applying a secondary transfer bias is connected to the belt unit 60.

Operation of forming a yellow image by using the first unit 10Y will now be described.

Before the operation, the charging roller 2Y charges the surface of the photoreceptor 1Y to a potential of −600 V to −800 V.

In the photoreceptor 1Y, a photosensitive layer is formed on a conductive substrate (for example, volume resistivity at 20° C.: not more than $1 \times 10^{-6}$ Ω·cm). The photosensitive layer, which usually has high resistivity (comparable to the resistivities of common resins), has the property of changing its specific resistance in the region irradiated with a laser beam. The exposure device 3 emits the laser beam 3Y based on yellow image data received from the controller (not shown) toward the charged surface of the photoreceptor 1Y. Thus, an electrostatic image of a yellow image pattern is formed on the surface of the photoreceptor 1Y.

The electrostatic image refers to an image formed on the surface of the photoreceptor 1Y owing to charging and is a so-called negative latent image formed as follows: part of the photosensitive layer irradiated with the laser beam 3Y is decreased in the specific resistance thereof, and this causes a release of electric charges on the charged surface of the photoreceptor 1Y, whereas electric charges remain in another part not irradiated with the laser beam 3Y.

The electrostatic image formed on the photoreceptor 1Y is rotated to a predetermined developing position as the photoreceptor 1Y moves. The electrostatic image on the photoreceptor 1Y is developed to a visible image as a toner image at this developing position by the developing device 4Y.

An electrostatic image developer containing, for example, at least a yellow toner and a carrier is contained in the developing device 4Y. The yellow toner is frictionally charged as it is stirred in the developing device 4Y, and carried on the developer roll (an example of developer-carrying member) while having charges having the same polarity (negative) as the charges on the photoreceptor 1Y. As the surface of the photoreceptor 1Y passes by the developing device 4Y, the yellow toner electrostatically adheres on the latent image portion on the photoreceptor 1Y from which charges are eliminated, and the latent image is thereby developed with the yellow toner. The photoreceptor 1Y on which the yellow toner image is formed is continuously moved at a predetermined velocity to transport the developed toner image on the photoreceptor 1Y to a predetermined primary transfer position.

When the yellow toner image on the photoreceptor 1Y is conveyed to the primary transfer position, a primary transfer bias is applied to the primary transfer roller 5Y, and an electrostatic force directed from the photoreceptor 1Y toward the primary transfer roller 5Y acts on the toner image, so that the toner image on the photoreceptor 1Y is transferred onto the intermediate transfer belt 20. The transfer bias applied then has the opposite polarity (positive) to the toner polarity (negative) and is controlled to, for example, +10 μA in the first unit 10Y by the controller (not shown).

Also, the primary transfer biases applied to the primary transfer rollers 5M, 5C, 5K of the second to fourth units 10M, 10C, 10K are controlled in the same manner as in the first unit.

In this manner, the intermediate transfer belt 20 onto which the yellow toner image has been transferred by the first unit 10Y is successively transported through the second to fourth units 10M, 10C, 10K, and toner images of respective colors are superposed and multi-transferred.

The intermediate transfer belt 20 onto which the toner images of four colors have been multi-transferred using the first to fourth units then reaches a secondary transfer part constituted by the intermediate transfer belt 20, the support roller 24, and the belt unit 60. Meanwhile, a recording sheet (an example of a recording medium) P is fed at a predetermined timing via a feeding mechanism to a space where the belt unit 60 and the intermediate transfer belt 20 contact each other, and a secondary transfer bias is applied to the support roller 24. In this case, the transfer bias to be applied has a polarity (negative polarity) the same as that of the toner (negative polarity), and an electrostatic force directed from the intermediate transfer belt 20 toward the recording sheet P acts on the toner image, so that the toner image on the intermediate transfer belt 20 is transferred onto the recording sheet P. In this case, the secondary transfer bias is determined on the basis of a resistance detected by a resistance detector (not illustrated) used for detecting a resistance of the secondary transfer part, and is voltage controlled.

The recording sheet P to which the toner image has been transferred is sent to a pressing portion (nip portion) between a pair of fixing rollers in a fixing device (an example of a fixing element) 28, and the toner image is fixed onto the recording sheet P to form a fixed image. The recording sheet P upon completion of the fixing of the color image is transported toward the discharging part to terminate a series of color image forming operations.

Examples of the recording sheet P onto which the toner images are transferred include regular paper used in electrophotographic system copying machines and printers. The recording medium is not limited to the recording sheet P and may be an overhead projector (OHP) sheet.

EXAMPLES

Exemplary embodiments will now be more specifically described with reference to the Examples below, but the exemplary embodiments are not limited to the Examples below. Synthesis, treatment, production, and the like were performed at room temperature (25° C.±3° C.) unless otherwise specified.

<Manufacture of Endless Belt>
(Production of Base Material Layer)
The components described below were blended in the addition amount (parts by mass) described in Table 1 to prepare a rubber composition.
EPDM: (ethylene propylene diene rubber, EP33 manufactured by JSR Corporation)
CR: (chloroprene rubber, TSR-61 manufactured by Tosoh Corporation)

CB1: (acetylene black, manufactured by Denka Company Limited, product name: Denka Black Particulate Product, number-average primary particle size: 35 nm)

CB2: (acetylene black, manufactured by Denka Company Limited, product name: Denka Black HS-100, number-average primary particle size: 48 nm)

CB3: (acetylene black, manufactured by Denka Company Limited, product name: Denka Black FX-35, number-average primary particle size: 23 nm)

Sulfur: (manufactured by Tsurumi Chemical Industry Co., Ltd.)

ZnO: (manufactured by Kyodo Chemical)

Vulcanization accelerator: (NOCCELER M, manufactured by Ouchi Shinko Chemical Industrial Co., Ltd.)

Stearic Acid

A rubber composition obtained by blending the above-described components at proportions described in Table 1 was put into a kneading extruder, kneaded for a time described in Table 1, extrusion-molded, and dried with hot air to obtain a tubular body having a diameter (outer diameter) of 40 mm and an average thickness of 490 μm. The tubular body was cut to have a length of 355 mm and used as a base material.

The coating liquid was sprayed on the outer peripheral surface of the base material while the base material was rotated with the central axis of the base material in the horizontal direction. The coating film was dried with hot air at a temperature of 150° C. for 35 minutes to form a protective layer having an average thickness of 6 μm on the outer peripheral surface of the base material. Next, the same coating liquid was also sprayed on the inner peripheral surface of the base material and dried with hot air in the same manner, thereby forming a protective layer having an average thickness of 6 μm on the inner peripheral surface of the base material.

Thus, an endless belt having protective layers on both surfaces of the base material layer was obtained.

<Cross Section Observation of Base Material Layer and Measurement of Endless Belt>

According to the above-described method, a section sample of the endless belt was prepared, and the total particle area rate (%), the large-diameter area rate (%), the medium-diameter area rate (%), the large-diameter number rate (%), the medium-diameter number rate (%), and the

TABLE 1

| | EPDM | CR | CB1 (35 nm) | CB2 (48 nm) | CB3 (23 nm) | Sulfur | ZnO | Vulcanization accelerator | Stearic acid | Kneading time (min) |
|---|---|---|---|---|---|---|---|---|---|---|
| Example 1 | 30 | 70 | 30 | 0 | 0 | 0.5 | 5 | 1 | 0.5 | 60 |
| Example 2 | 30 | 70 | 30 | 0 | 0 | 0.5 | 5 | 1 | 0.5 | 45 |
| Example 3 | 30 | 70 | 27 | 0 | 0 | 0.5 | 5 | 1 | 0.5 | 75 |
| Example 4 | 30 | 70 | 35 | 0 | 0 | 0.5 | 5 | 1 | 0.5 | 60 |
| Example 5 | 30 | 70 | 25 | 0 | 0 | 0.5 | 5 | 1 | 0.5 | 60 |
| Example 6 | 30 | 70 | 37 | 0 | 0 | 0.5 | 5 | 1 | 0.5 | 60 |
| Example 7 | 30 | 70 | 23 | 0 | 0 | 0.5 | 5 | 1 | 0.5 | 60 |
| Example 8 | 30 | 70 | 20 | 12 | 0 | 0.5 | 5 | 1 | 0.5 | 60 |
| Example 9 | 30 | 70 | 30 | 0 | 0 | 0.5 | 5 | 1 | 0.5 | 90 |
| Example 10 | 30 | 70 | 0 | 0 | 30 | 0.5 | 5 | 1 | 0.5 | 60 |
| Example 11 | 30 | 70 | 25 | 0 | 5 | 0.5 | 5 | 1 | 0.5 | 35 |
| Example 12 | 30 | 70 | 20 | 12 | 0 | 0.5 | 5 | 1 | 0.5 | 30 |
| Example 13 | 30 | 70 | 30 | 0 | 0 | 0.5 | 5 | 1 | 0.5 | 120 |
| Comparative Example 1 | 30 | 70 | 27 | 0 | 0 | 0.5 | 5 | 1 | 0.5 | 120 |
| Comparative Example 2 | 30 | 70 | 27 | 0 | 0 | 0.5 | 5 | 1 | 0.5 | 35 |
| Comparative Example 3 | 30 | 70 | 0 | 37 | 0 | 0.5 | 5 | 1 | 0.5 | 60 |
| Comparative Example 4 | 30 | 70 | 20 | 0 | 0 | 0.5 | 5 | 1 | 0.5 | 60 |
| Comparative Example 5 | 30 | 70 | 0 | 37 | 0 | 0.5 | 5 | 1 | 0.5 | 15 |
| Comparative Example 6 | 30 | 70 | 0 | 20 | 0 | 0.5 | 5 | 1 | 0.5 | 15 |
| Comparative Example 7 | 30 | 70 | 0 | 37 | 0 | 0.5 | 5 | 1 | 0.5 | 240 |
| Comparative Example 8 | 30 | 70 | 0 | 0 | 20 | 0.5 | 5 | 1 | 0.5 | 240 |

(Production of Protective Layer)

One percent by mass of a curing agent (Loctite WH-1, manufactured by Henkel Japan Ltd.) was added to a polytetrafluoroethylene (PTFE)-containing urethane resin (Bonderite T862A, manufactured by Henkel Japan Ltd.), and the mixture was diluted with water to prepare a coating liquid.

average equivalent circular diameter (nm) of the conductive particles contained in the base material layer were determined. The results are shown in Table 2.

The volume resistivity of the endless belt was measured by the method described above. The results are shown in Table 2.

TABLE 2

|  | Total particle area rate (%) | Large-diameter area rate (%) | Medium-diameter area rate (%) | Large-diameter number rate (%) | Medium-diameter number rate (%) | Average equivalent circular diameter (nm) | Volume resistivity ($\Omega \cdot$ cm) |
|---|---|---|---|---|---|---|---|
| Example 1 | 11.8 | 54.2 | 18.5 | 11.4 | 11.2 | 35.5 | $7.9 \times 10^8$ |
| Example 2 | 12.0 | 61.3 | 16.4 | 12.7 | 9.3 | 41.3 | $4.6 \times 10^8$ |
| Example 3 | 10.1 | 35.2 | 20.5 | 5.5 | 11.0 | 29.2 | $3.8 \times 10^9$ |
| Example 4 | 14.0 | 53.7 | 20.2 | 10.7 | 10.8 | 32.5 | $5.4 \times 10^7$ |
| Example 5 | 9.5 | 56.5 | 17.3 | 11.1 | 9.6 | 37.9 | $7.1 \times 10^9$ |
| Example 6 | 14.4 | 55.6 | 18.0 | 11.6 | 9.9 | 37.6 | $2.3 \times 10^7$ |
| Example 7 | 9.1 | 53.1 | 21.3 | 10.2 | 11.4 | 28.5 | $1.5 \times 10^{10}$ |
| Example 8 | 14.2 | 64.8 | 18.3 | 13.6 | 9.5 | 43.0 | $1.3 \times 10^7$ |
| Example 9 | 11.5 | 28.3 | 21.6 | 3.5 | 12.5 | 27.1 | $2.0 \times 10^9$ |
| Example 10 | 10.9 | 42.3 | 21.8) | 7.3 | 13.4 | 30.8 | $9.1 \times 10^8$ |
| Example 11 | 12.1 | 63.4 | 16.1 | 13.2 | 7.5 | 41.9 | $4.3 \times 10^8$ |
| Example 12 | 14.3 | 64.5 | 16.2 | 13.5 | 8.6 | 43.6 | $1.2 \times 10^7$ |
| Example 13 | 11.2 | 28.4 | 21.7 | 3.7 | 13.1 | 26.8 | $2.2 \times 10^9$ |
| Comparative Example 1 | 10.0 | 26.3 | 21.4 | 3.2 | 13.7 | 26.3 | $3.1 \times 10^9$ |
| Comparative Example 2 | 10.3 | 72.8 | 15.6 | 15.8 | 7.1 | 48.4 | $2.1 \times 10^8$ |
| Comparative Example 3 | 15.5 | 54.5 | 18.1 | 10.8 | 10.8 | 37.2 | $3.9 \times 10^6$ |
| Comparative Example 4 | 8.3 | 55.9 | 17.5 | 11.2 | 9.9 | 39.6 | $6.4 \times 10^{11}$ |
| Comparative Example 5 | 15.3 | 70.3 | 15.9 | 15.0 | 7.3 | 46.7 | $4.8 \times 10^6$ |
| Comparative Example 6 | 8.5 | 75.4 | 12.8 | 16.4 | 5.9 | 50.9 | $5.7 \times 10^{11}$ |
| Comparative Example 7 | 15.2 | 23.6 | 24.4 | 2.5 | 14.2 | 21.4 | $9.9 \times 10^6$ |
| Comparative Example 8 | 8.1 | 20.7 | 25.7 | 1.3 | 15.5 | 20.3 | $7.3 \times 10^{11}$ |

<Performance Evaluation of Endless Belt>
(Electric Field Dependency of Resistance Value)

The endless belt was placed in an environment having a temperature of 22° C. and a relative humidity of 55% for 24 hours or longer to control the temperature and humidity. A resistance value (unit: log ($\Omega$)) was measured under measurement conditions of an applied voltage: 100 V or 500 V, an application time: 5 seconds, and a load: 1 kgf using a microammeter (Advantest Corporation, R8430A) and a UR probe (Mitsubishi Chemical Corporation) in the same temperature-humidity environment. The measurement was performed at a total of 18 measurement points taken at 3 points at the center and both ends in the width direction of the endless belt and 6 points at equal intervals in the circumferential direction. The measured values at 18 points for each of the applied voltages of 100 V and 500 V were arithmetically averaged, and the difference between the average value for the applied voltage of 100 V and the average value for the applied voltage of 500 V was classified as follows. The results are shown in Table 3.

A: The difference is 1 or more
B: The difference is 0.8 or more and less than 1
C: The difference is less than 0.8

(Image Quality -Density Unevenness and Color Loss-)

The transfer performance of the endless belt was evaluated based on density unevenness of an image and color loss.

The endless belt of each of Examples and Comparative Examples was mounted on an image forming apparatus Versant 3100i Press (FUJIFILM Business Innovation Corporation) as a secondary transfer belt.

The image forming apparatus was placed in an environment of a temperature of 22° C. and a relative humidity of 55% for 24 hours or more, and a black halftone image having an image density of 30% was formed on one entire surface of A3 size paper in the same environment.

The density unevenness was evaluated by measuring the image density of the halftone image with a density measuring device X-Rite 404 (manufactured by X-Rite Inc.). A total of 9 measurement points taken at 3 points at the center and both ends in the long side direction of the A3 size paper and 3 points at the center and both ends in the short side direction of the A3 size paper were set. For the image density at the 9 points, the difference between the maximum image density and the minimum image density is classified as follows. The results are shown in Table 3.

G1: The difference is less than 0.05
G2: The difference is 0.05 or more and less than 0.15
G3: The difference is 0.15 or more Regarding the color loss, the presence or absence of color loss in the halftone image was visually observed and evaluated according to the following standards. The results are shown in Table 3.

G1: No color loss was observed.
G2: Color loss was slightly observed, but was within an allowable range.
G3: Color loss was observed and exceeded the allowable range.

(Bending Resistance>

The endless belt having a sample width of 15 mm was repeatedly bent in accordance with JIS-P8115:2001 using an MIT tester at a tensile load of 1 kg. The surface of the endless belt was visually observed every 500,000 times of bending with one reciprocation as one time, and the time when cracks occurred was classified as follows. The results are shown in Table 3.

A: No cracks occurred at 2,000,000 times of bending
B: Cracks occurred at 2,000,000 times of bending
C: Cracks occurred at 1,500,000 times of bending
D: Cracks occurred at 1,000,000 times or less of bending

TABLE 3

|  | Electric field dependency | Density unevenness | Color loss | Bending resistance |
|---|---|---|---|---|
| Example 1 | A | G1 | G1 | A |
| Example 2 | B | G1 | G1 | B |
| Example 3 | B | G1 | G2 | B |
| Example 4 | B | G2 | G1 | A |
| Example 5 | A | G2 | G1 | A |
| Example 6 | B | G2 | G1 | B |
| Example 7 | A | G1 | G1 | A |
| Example 8 | B | G2 | G1 | B |
| Example 9 | B | G1 | G2 | B |
| Example 10 | A | G1 | G1 | A |
| Example 11 | B | G1 | G1 | B |
| Example 12 | B | G2 | G1 | B |
| Example 13 | B | G1 | G2 | B |
| Comparative Example 1 | A | G1 | G3 | C |
| Comparative Example 2 | B | G2 | G1 | C |
| Comparative Example 3 | C | G3 | G1 | C |
| Comparative Example 4 | C | G3 | G1 | B |
| Comparative Example 5 | C | G3 | G1 | D |
| Comparative Example 6 | C | G3 | G1 | D |
| Comparative Example 7 | C | G3 | G3 | D |
| Comparative Example 8 | C | G3 | G3 | D |

It is clear from the above results that, compared with Comparative Examples, suppression of density unevenness of an image and suppression of the occurrence of cracks in the base material layer of the endless belt are realized in the Examples.

What is claimed is:

1. An endless belt comprising:
a base material layer containing a polymer material and conductive particles,
wherein, in an image obtained by observing a cross section taken along a thickness direction of the base material layer with an atomic force microscope, a proportion of a total area Ap of cross sections of all the conductive particles is 9.0% or more and 14.5% or less with respect to a total cross-sectional area At of the base material layer, and a proportion of a total area Ab of cross sections of conductive particles having an area of 0.01 $\mu m^2$ or more among cross sections of the conductive particles is 28.0% or more and 65.0% or less with respect to the total area Ap of cross sections of all the conductive particles.

2. The endless belt according to claim 1, wherein a proportion of the total area Ap of cross sections of all the conductive particles is 9.5% or more and 14.0% or less with respect to the total cross-sectional area At of the base material layer.

3. The endless belt according to claim 1, wherein a proportion of the total area Ab of cross sections of the conductive particles having an area of 0.01 $\mu m^2$ or more is 35.2% or more and 61.3% or less with respect to the total area Ap of cross sections of all the conductive particles.

4. The endless belt according to claim 1, wherein a proportion of a total area Am of cross sections of conductive particles having an area of 0.005 $\mu m^2$ or more and less than 0.01 $\mu m^2$ among cross sections of the conductive particles is 16.1% or more and 21.8% or less with respect to the total area Ap of cross sections of all the conductive particles.

5. An endless belt comprising:
a base material layer containing a polymer material and conductive particles,
wherein, in an image obtained by observing a cross section taken along a thickness direction of the base material layer with an atomic force microscope, a proportion of a total area Ap of cross sections of all the conductive particles is 9.0% or more and 14.5% or less with respect to a total cross-sectional area At of the base material layer, and a proportion of a number Nb of cross sections of conductive particles having an area of 0.01 $\mu m^2$ or more among cross sections of the conductive particles is 3.5% or more and 13.7% or less with respect to a total number Np of cross sections of the conductive particles.

6. The endless belt according to claim 5, wherein a proportion of a number Nm of cross sections of conductive particles having an area of 0.005 $\mu m^2$ or more and less than 0.01 $\mu m^2$ among cross sections of the conductive particles is 7.5% or more and 13.5% or less with respect to the total number Np of cross sections of the conductive particles.

7. The endless belt according to claim 1, wherein the polymer material contains an ion-conductive rubber.

8. The endless belt according to claim 7, wherein the ion-conductive rubber contains at least one selected from the group consisting of epichlorohydrin rubber and chloroprene rubber.

9. The endless belt according to claim 1, wherein the conductive particles include electron-conductive particles.

10. The endless belt according to claim 9, wherein the electron-conductive particles include carbon black.

11. The endless belt according to claim 1, wherein the conductive particles have an average equivalent circular diameter of cross sections of 26.7 nm or more and 43.8 nm or less.

12. The endless belt according to claim 1, further comprising:
a release layer provided on at least one of an outer peripheral surface or an inner peripheral surface of the base material layer.

13. A belt unit comprising:
the endless belt according to claim 1; and
a plurality of roller members over which the endless belt is stretched under tension,
wherein the belt unit is attached to or detached from an image forming apparatus.

14. An image forming apparatus comprising:
a photoreceptor;
a charging element configured to charge a surface of the photoreceptor;
an electrostatic image-forming element configured to form an electrostatic image on the charged surface of the photoreceptor;
a developing element configured to contain a developer containing a toner and develop the electrostatic image formed on the surface of the photoreceptor with the developer to form a toner image; and
a transfer element including the belt unit according to claim 13 and configured to transfer the toner image onto a recording medium.

15. The image forming apparatus according to claim 14, wherein the transfer element includes:
an intermediate transfer member;
a primary transfer element configured to transfer the toner image onto a surface of the intermediate transfer member; and a secondary transfer element configured to transfer the toner image transferred onto the surface of the intermediate transfer member onto a recording medium, and includes the belt unit according to claim 13 as the secondary transfer element.

* * * * *